United States Patent [19]
Stephenson

[11] 3,733,088
[45] May 15, 1973

[54] VEHICLE PASSENGER RESTRAINT SYSTEM

[75] Inventor: Robert L. Stephenson, Sterling Heights, Mich.

[73] Assignee: Allied Chemical Corporation, New York, N.Y.

[22] Filed: Apr. 9, 1971

[21] Appl. No.: 132,856

[52] U.S. Cl. ............................................. 280/150 AB
[51] Int. Cl. .............................................. B60r 21/02
[58] Field of Search .................. 280/150 AB, 150 B; 23/281

[56] References Cited

UNITED STATES PATENTS

| | | | |
|---|---|---|---|
| 3,602,527 | 8/1971 | Goetz et al. | 280/150 AB |
| 3,606,377 | 9/1971 | Martin | 280/150 AB |
| 3,649,045 | 3/1972 | Smith et al. | 23/281 X |
| 3,638,755 | 2/1972 | Sack | 280/150 AB |
| 3,558,285 | 1/1971 | Ciccone et al. | 23/281 |
| 3,618,977 | 11/1971 | Klove, Jr. et al. | 280/150 AB |
| 2,834,606 | 5/1958 | Bertrand | 280/150 AB |
| 3,588,142 | 6/1971 | Gorman | 280/150 AB |
| 3,133,746 | 5/1964 | Zazzara | 280/150 B |

*Primary Examiner*—Leo Friaglia
*Assistant Examiner*—John P. Silverstrim
*Attorney*—Marvin Bressler and Jonathan Plant

[57] ABSTRACT

A vehicle safety assembly for passengers seated in the rear seat assembly of a vehicle passenger compartment. The assembly includes an inflatable bag which is stored in a non-inflated condition above and behind the front seat of the vehicle for limiting forward movement of the rear seat assembly passengers. The assembly includes gas generating means disposed along the roof rail of the vehicle in communication with manifold means disposed across the roof of the vehicle above the rear seat assembly. In turn, the manifold means is in communication with the inflatable bag which is disposed about the manifold in a coil-like fashion. Upon impact or collision of the vehicle the gas generating means is triggered with the resultant inflation of the inflatable gas bag.

2 Claims, 3 Drawing Figures

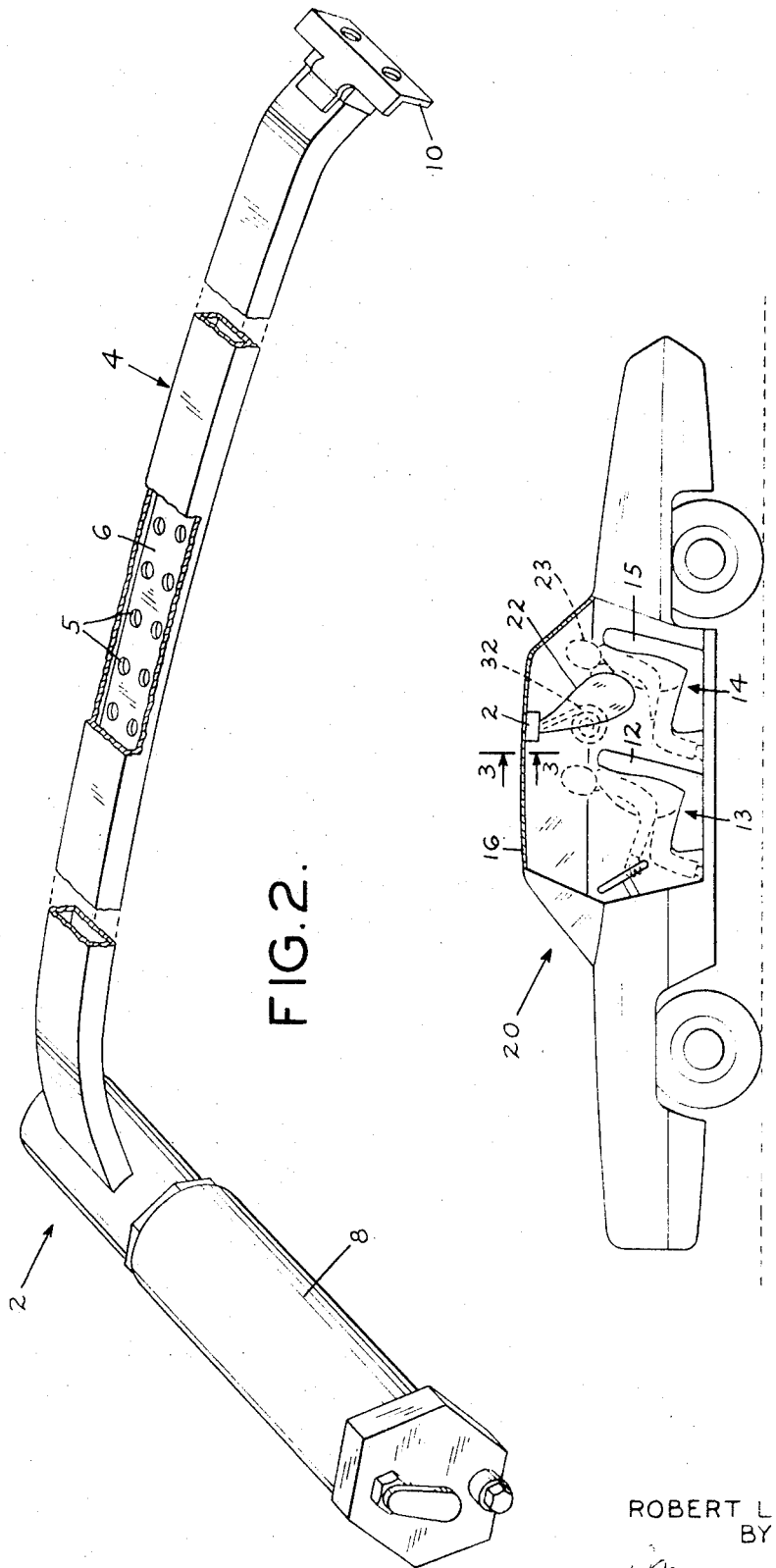

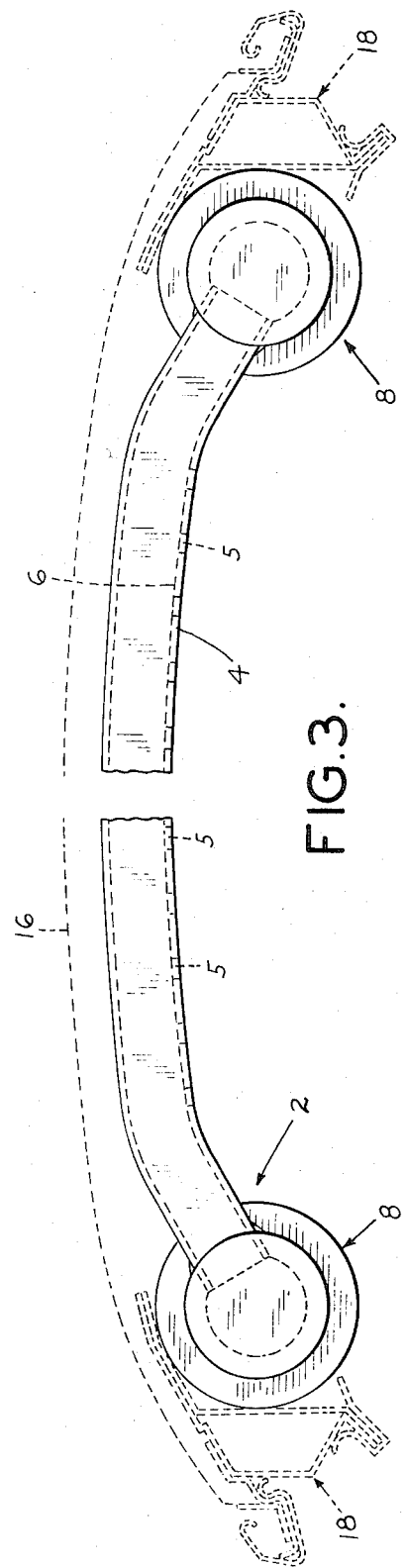

VEHICLE PASSENGER RESTRAINT SYSTEM

BACKGROUND OF THE DISCLOSURE

The instant invention is directed to a vehicle safety assembly which restrains the movement of passengers in a vehicle which has been involved in an impact or collision. More specifically, the instant invention is directed to a vehicle safety assembly for restraining occupants seated in the rear assembly of a vehicle which has been involved in an impact or collision. Still more specifically, the instant invention is directed to a vehicle safety assembly which restrains movement of rear seat passengers of a vehicle involved in an impact or collision by providing an inflatable device which is inflated immediately upon impact to restrain the passengers between the inflatable device and the back rest portion of the rear seat assembly.

There has been, in recent times, a great deal of effort expended on improvement of passenger restraint systems for use in motor vehicles. Specifically, much effort has been given to developing a passive passenger restraint system. Although combination of a lap seat belt and a shoulder harness provide excellent protection in the event of a motor vehicle impact or collision, a passive system is deemed necessary in view of the large numbers of vehicle occupants who fail to fasten these restraining belts. Because a system of inflatable bags, which inflate upon impact or collision of the vehicle, does not require any positive act on the part of a vehicle occupant their use has been encouraged as a passive restraining means.

A particular problem, however, exists in the use of an inflatable gas bag restraint system for passengers seated in the rear assembly of a motor vehicle. Deployment of a plurality of air bags in front of each passenger is difficult. Rear seat passengers, assuming the non-use of seat belts, are free to move about the typical bench-like construction of a rear seat assembly. Thus, it is difficult to position individual inflatable bags directly in front of the passengers in order to insure restraint of these individuals. This problem is made worse upon impact of the vehicle. In some instances, the inflated bag may move as a result of being contacted by the occupant with the resultant movement of the occupant past the inflated bag.

A second defect in individual inflatable bags, for use by passengers seated in the rear seat assembly, is directed to the lack of space available in the rear seat area of the passenger compartment. It is very difficult to dispose a plurality of individual collapsed inflatable bag assemblies, and gas generating means associated with these bags, in this space and still retain sufficiently leg room for rear seat passengers. This problem is further complicated by the recent development of smaller automobiles which have little leg room even without inflatable gas bag assemblies.

In order to overcome these problems, newer rear seat assemblies have emphasized single inflatable bag assemblies mounted in the roof of the vehicle. These assemblies suffer from a significant decrease in head room caused by the disposition of these assemblies in the roof above the rear seat compartment of the vehicle.

SUMMARY OF THE INVENTION

The instant invention is directed to a vehicle safety assembly for restraining passengers seated in the rear seat assembly of a motor vehicle, particularly an automobile. In this safety assembly, a single inflatable gas bag, non-inflatedly stored in a coil in the passenger compartment roof of the vehicle is employed instead of a plurality of gas bags assemblies placed in front of the rear seat assembly. The gas bag assembly, disposed as it is in the roof of the vehicle, between the front and rear seat assemblies, does not affect leg room available to rear seat passengers. Moreover, the gas generator means for inflation of the non-inflated bag is disposed along the roof rail of the vehicle so that the assembly does not significantly decrease the head room in the rear seat compartment. Loss of head room is further limited by employment, in a preferred embodiment, of a rectangular shaped manifold means, instead of cylindrically shaped manifold means.

In accordance with the instant invention a vehicle safety assembly is provided which includes a manifold means comprising a diffuser disposed in the roof of the vehicle above and behind the front seat assembly. A non-inflated, inflatable bag, in communication with the manifold means, is stored about the manifold means in a coil-like configuration. At least one gas generator, comprising a gas generator means, is disposed along the roof rail of the vehicle in communication with the manifold means. In this disposition, the gas generator of the gas generator means is situated approximately normally to the diffuser of the manifold means. Upon impact or collision of the vehicle, the gas generating means is activated with the resultant inflation of the inflatable bag. In the process of inflating the bag, the inflatable bag is unwound in a backward and downward direction thus constraining the passengers in the rear seat assembly between the inflated bag and the vertical portion of the rear seat assembly. In this position passengers are prevented from moving forward, thus, preventing the passengers from hitting hard objects or other occupants in the vehicle.

BRIEF DESCRIPTION OF THE DRAWINGS

The instant invention may be better understood by reference to the accompanying drawings of which:

FIG. 1 is an illustration showing the operation of the inflatable gas bag assembly of the instant invention in a motor vehicle involved in an impact;

FIG. 2 is a perspective view with portions cut away of the inflatable gas bag assembly of the instant invention; and FIG. 3 is a sectional view taken along line 3—3 of FIG. 1.

DETAILED DESCRIPTION

Turning now to FIG. 2 in detail, the gas generating assembly is generally indicated at 2. The assembly 2 includes a manifold means. The manifold means is preferably an elongated hollow diffuser 4. The diffuser 4 has a length approximately equivalent to the length of the rear seat assembly of the vehicle in which it is installed. As illustrated in FIG. 2, in a preferred embodiment, the diffuser 4 has a rectangular cross-section. It is provided with a plurality of holes 5 along its bottom face 6. It should be appreciated that the diffuser 4 may also be provided with holes of the type illustrated at 5 in the top face of the diffuser 4 depending upon the disposition of the inflatable gas bag in communication with diffuser 4.

The diffuser 4 is in communication with a gas generating means. The gas generating means comprises at least one gas generator 8 disposed at approximately right angles with the diffuser 4. The gas generator 8 may be any of the gas generators suggested in the art for rapidly providing a large volume of pressurized gas to inflate a gas bag disposed about a manifold means. Preferably, the gas generator 8 of the instant invention comprises a pyrotechnic device in which all the gas is generated by the combustion of a combustible material which is ignited upon collision of the vehicle in which the generating means 8 is disposed. Alternately, in another preferred embodiment, the gas generating means 8 comprises at least one gas generator employing a hybrid gas generating system. A hybrid system is one in which the gas employed to inflate a gas bag comprises gas generated by the combustion of a combustible material in addition to gas stored under pressurized conditions. In the embodiment illustrated in FIG. 2 one gas generator 8 is provided. Alternately, in another preferred embodiment, a second gas generator is also provided. Obviously, the second generator, if provided, is of the same type as the first. If a second generator is provided it is disposed at the other end of the diffuser 4. Again, in the case where two gas generating means are provided, the second gas generator means, in communication with the diffuser 4, is disposed at approximately right angles with the diffuser 4. In the case where a single gas generator 8 is provided, as illustrated in FIG. 2, the end of the diffuser 4 opposite the end in communication with the gas generator 8 is provided with a bracket 10 which fastens the diffuser 4 to one side of the roof rail of the vehicle.

In the unique arrangement of the instant invention, the gas generator 8 is disposed adjacent and connected to the roof rail 18 of the vehicle in which it is disposed. A typical motor vehicle has space available adjacent to the roof rail 18 for the disposition of a body, preferably cylindrical. Thus, the gas generating means, which is preferably cylindrically shaped, is disposed in this space. In the prior art, a gas generating means was usually disposed piggyback with the diffuser means resulting in a decreased head room due to the bulge in the roof of the vehicle. The gas bag restraint assembly 2 of the instant invention overcomes this deficiency of the prior art. This deficiency of the prior art is further remedied by the preferred use of a diffuser, of the type illustrated at 4, having a rectangular cross-section. This further reduces the volume of the assembly 2. Loss of space is also minimized by employment of a pyrotechnic hybrid generator 8 which takes up less volume then prior art generators employing pressurized gas only.

In the case where two gas generating means are provided, as illustrated in FIG. 3, the second gas generating means is disposed in the space provided adjacent the roof rail on the other side of the vehicle. It should be understood that a motor vehicle is typically provided with two approximately parallel roof rails disposed in the roof section of the vehicle.

In operation, an inflatable gas bag 22 is stored about the diffuser 4 of the manifold means in a non-inflated condition. The non-inflated bag 22, in a preferred embodiment, is stored in a coil-like configuration. Upon impact of the vehicle a sensing device transmits a signal to the gas generator 8 which results in the generation of gas and the subsequent flow of the gas from the gas generator 8 into the diffuser 4. The gas flows through the plurality of holes 5 of the diffuser 4 into the gas bag 22. As gas inflates the bag 22, the bag uncoils during the bag inflation period. This is shown in FIG. 1 which illustrates a vehicle 20 provided with the assembly 2 of the instant invention provided in the roof 16 above and behind the front seat assembly 13, but in front of the rear seat assembly 14. The bag is shown partially inflated in dotted lines to emphasize the uninflated portion of the bag in a coiled condition. Reference numeral 32 is used to indicate the coiled condition of the bag when non-inflated. When the bag is fully inflated (solid lines) it constrains all the passengers, illustrated in FIG. 1 by a single passenger 23 seated in the rear seat assembly 14 against the rear seat back rest 15. Obviously, a passenger 23 is restrained against forward movement towards the back rest portion 12 of the front seat assembly 13. This prevents the possibility of a rear seat passenger banging into a front seat occupant, or another rear seat passenger, a danger often encounted in collisions.

The above-described preferred embodiment is meant to be illustrative of the scope and spirit of the instant invention. The scope of the instant invention will make apparent other embodiments in addition to the ones described above. Therefore, the scope of the instant invention should be limited only by the appended claims.

What is claimed is:

1. An inflatable gas bag assembly, disposed in a vehicle having a front and rear seat assembly, comprising:
   a manifold extending transversely across the roof of said vehicle and disposed in the roof of said vehicle above and behind the front seat assembly;
   an inflatable gas bag in a non-inflated condition stored in a coil-like configuration about said manifold and in communication with said manifold;
   a gas generator means connected to the roof rail of said vehicle in communication with said manifold, said gas generator means comprising two gas generators connected, approximately normally, to said manifold at each end of said manifold to generate gas to inflate said gas bag upon collision of said vehicle, said gas generators each taken from a class consisting of (1) a combustible material ignited upon collision of said vehicle to produce a volume of generated gas sufficient to inflate said gas bag and (2) a hybrid gas generator employing stored, pressurized gas and gas generated by the combustion of a combustible material ignited upon collision of said vehicle to inflate said inflatable gas bag.

2. An assembly, in accordance with claim 1, wherein said manifold comprises a diffuser having a rectangular cross-section.

* * * * *